US007637353B2

(12) United States Patent
Shibata

(10) Patent No.: US 7,637,353 B2
(45) Date of Patent: Dec. 29, 2009

(54) CONTROL DEVICE FOR ELEVATOR

(75) Inventor: Masunori Shibata, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 11 days.

(21) Appl. No.: 12/097,426

(22) PCT Filed: May 16, 2006

(86) PCT No.: PCT/JP2006/309739

§ 371 (c)(1),
(2), (4) Date: Jun. 13, 2008

(87) PCT Pub. No.: WO2007/132523

PCT Pub. Date: Nov. 22, 2007

(65) Prior Publication Data

US 2009/0133966 A1 May 28, 2009

(51) Int. Cl.
*B66B 1/28* (2006.01)
*B66B 5/04* (2006.01)
*H02P 6/06* (2006.01)

(52) U.S. Cl. ....................... 187/293; 187/286; 187/393; 318/432; 318/721

(58) Field of Classification Search ................. 187/281, 187/286, 293, 391–393; 318/432, 434, 719, 318/721, 369, 803
See application file for complete search history.

(56) References Cited

U.S. PATENT DOCUMENTS 4,308,936 A * 1/1982 Caputo et al. ............... 187/316
4,553,640 A * 11/1985 Inaba et al. ................. 187/292
4,624,343 A * 11/1986 Tanahashi et al. ........... 187/296
5,648,644 A * 7/1997 Nagel ......................... 187/288
5,757,156 A * 5/1998 Sasajima .................... 318/456
5,757,161 A * 5/1998 Ikkai et al. .................. 318/719
5,780,786 A * 7/1998 Miyanishi ................... 187/293
6,173,813 B1 * 1/2001 Rebillard et al. ............ 187/287
6,202,796 B1 * 3/2001 Lee ............................ 187/293
7,117,979 B2 * 10/2006 Angst et al. ................. 187/351
7,332,884 B2 * 2/2008 Rozman et al. ............. 318/432
7,448,472 B2 * 11/2008 Kugiya et al. ............... 187/305
7,567,047 B2 * 7/2009 Rozman ............... 318/400.17
2008/0045377 A1 * 2/2008 Kaya ........................... 477/43
2008/0199160 A1 * 8/2008 Yamazaki ................... 388/815
2008/0315802 A1 * 12/2008 Ueda et al. ...................... 318/3
2009/0042688 A1 * 2/2009 Itou et al. ...................... 477/3

FOREIGN PATENT DOCUMENTS

JP 5 306074 11/1993

(Continued)

*Primary Examiner*—Walter Benson
*Assistant Examiner*—Eduardo Colon-Santana
(74) *Attorney, Agent, or Firm*—Oblon, Spivak, McClelland, Maier & Neustadt, L.L.P.

(57) ABSTRACT

A control apparatus for an elevator has a speed command issuing portion, a movement control portion, and an acceleration limiting portion. The speed command issuing portion calculates a speed command for controlling a speed of a car. The movement control portion controls a movement of the car based on the speed command. The acceleration limiting portion compares drive information corresponding to an output of a drive device during the movement of the car with a preset limit value to determine whether or not an acceleration of the car can be increased. The speed command issuing portion calculates, based on information from the acceleration limiting portion, a speed command to stop the acceleration from increasing when the drive information reaches the limit value.

4 Claims, 7 Drawing Sheets

FOREIGN PATENT DOCUMENTS

| | | |
|---|---|---|
| JP | 7 291542 | 11/1995 |
| JP | 9 2753 | 1/1997 |
| JP | 2002 302359 | 10/2002 |
| JP | 2003 238037 | 8/2003 |
| JP | 2003 267638 | 9/2003 |
| JP | 2004 137003 | 5/2004 |

* cited by examiner

| IN-CAR LOAD RATIO [%] | 0−10 | 10−20 | EQUAL TO OR HIGHER THAN 20 |
|---|---|---|---|
| ACCELERATION SET VALUE [m/s²] | 0.6 | 0.8 | 1.0 |

CONTROL DEVICE FOR ELEVATOR

TECHNICAL FIELD

The present invention relates to a control apparatus for an elevator which serves to control a movement of a car.

BACKGROUND ART

Conventionally, with a view to confining an output of a hoisting machine for moving a car within a predetermined range, there is proposed an elevator apparatus for changing an acceleration/deceleration of the car in accordance with a riding load of the car. The car is provided with a weighing device for detecting the riding load thereof. A control device performs control to reduce the acceleration/deceleration of the car when the riding load is higher than a predetermined load (set value) (see Patent Document 1).

Patent Document 1: JP 2004-137003 A

DISCLOSURE OF THE INVENTION

Problem to be Solved by the Invention

However, detection of the riding load by the weighing device tends to entail an error due to, for example, the movements or the like of passengers within the car. For this reason, in order to prevent the output of the hoisting machine from deviating from the predetermined range, a set value to be compared with the riding load needs to be set low in consideration of the error in detection made by the weighing device. Accordingly, the output of the hoisting machine is limited although a driving capacity of the hoisting machine has not been depleted yet. As a result, the car cannot be accelerated efficiently.

The present invention has been made to solve the above-mentioned problem, and it is therefore an object of the present invention to provide a control apparatus for an elevator which makes it possible to enhance a traveling efficiency of the elevator within a range of the driving capacity of a drive device.

Means for Solving the Problems

A control apparatus for an elevator according to the present invention includes: a speed command issuing portion for calculating a speed command for controlling a speed of a car; a movement control portion for controlling a movement of the car based on the speed command; and an acceleration limiting portion for determining whether or not an acceleration of the car can be increased by comparing drive information corresponding to an output of a drive device during the movement of the car with a preset limit value. In the control apparatus for an elevator, the speed command issuing portion calculates, based on information from the acceleration limiting portion, the speed command to stop the acceleration from increasing when the drive information is at the limit value.

BEST MODES FOR CARRYING OUT THE INVENTION

Preferred embodiments of the present invention will be described hereinafter with reference to the drawings.

Embodiment 1

Figure 1:
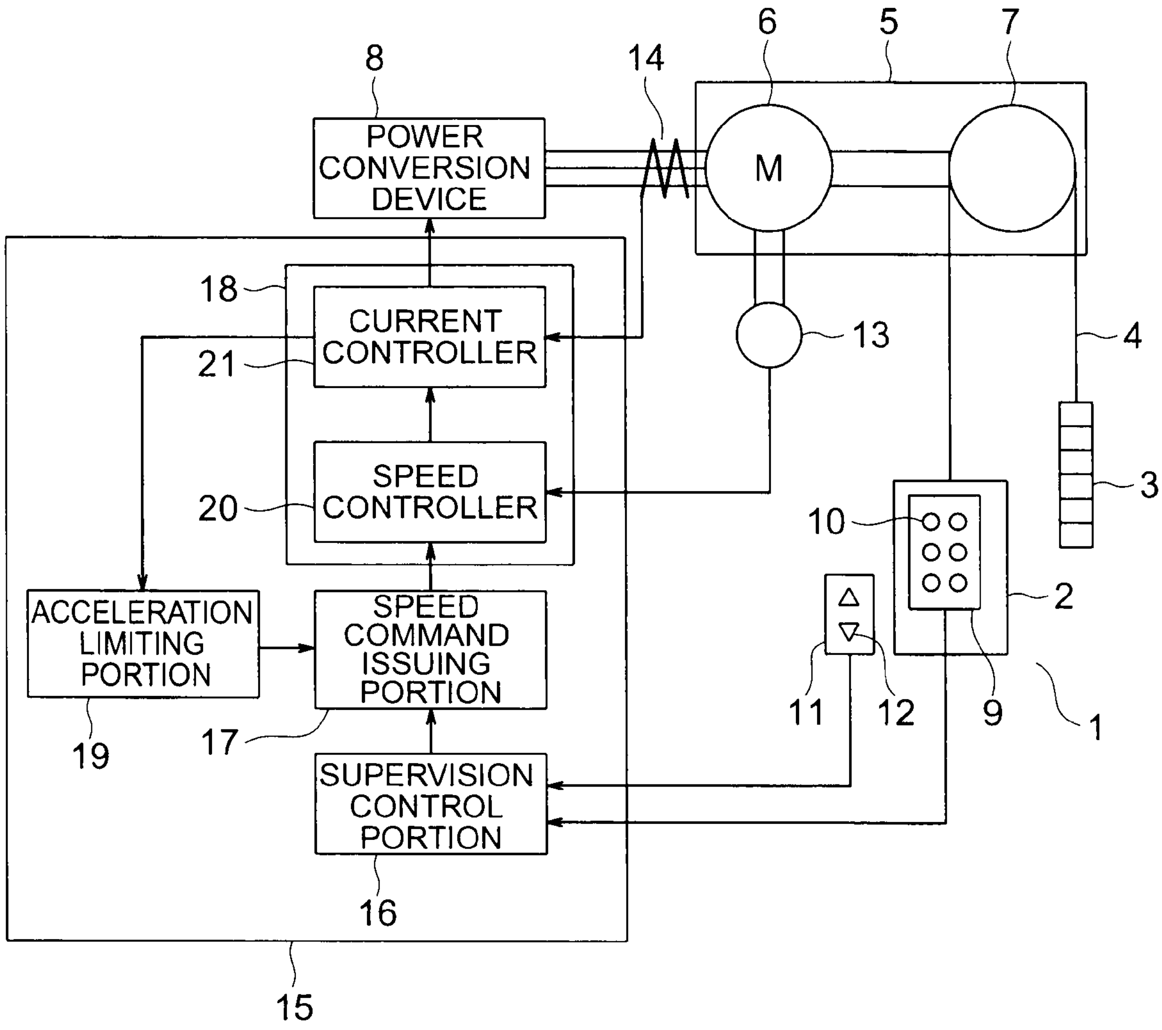
FIG. 1 is a schematic diagram showing an elevator according to Embodiment 1 of the present invention.

FIG. 1 is a schematic diagram showing an elevator according to Embodiment 1 of the present invention. Referring to FIG. 1, a car 2 and a counterweight 3 are suspended within a hoistway 1 by a main rope 4. A hoisting machine (drive device) 5 for moving the car 2 and the counterweight 3 is provided in an upper portion of the hoistway 1. The hoisting machine 5 has a motor 6, and a drive sheave 7 that is rotated by the motor 6. The drive sheave 7 is rotated by the motor 6 supplied with power. The motor 6 is supplied with power by a power conversion device 8. The main rope 4 is looped around the drive sheave 7. The car 2 and the counterweight 3 are moved within the hoistway 1 through rotation of the drive sheave 7.

A car manipulation panel 9 is provided within the car 2. The car manipulation panel 9 is provided with a plurality of car call buttons 10 for making call registrations. A landing manipulation panel 11 is provided at a landing of each floor. The landing manipulation panel 11 is provided with a plurality of landing call buttons 12 for making call registrations.

The motor 6 is provided with a speed detector (e.g., encoder) 13 for detecting a rotational speed of the drive sheave 7. The value of a current supplied from the power conversion device 8 to the motor 6 (motor current) is detected by a current detector (CT) 14 as a motor current value.

The power conversion device 8 is supplied with power from a commercial power supply via a breaker (not shown). The breaker prevents an overcurrent from flowing into the power conversion device 8. The power conversion device 8 is a PWM control inverter for generating a plurality of direct-current voltage pulses within the fundamental frequency of an alternating voltage to adjust an output voltage. That is, the output voltage of the power conversion device 8 is controlled by adjusting the switching duty ratio of the voltage applied to the motor 6.

Information from the car manipulation panel 9, information from the landing manipulation panel 11, information from the speed detector 13, and information from the current detector 14 are transmitted to a control device 15 for controlling the operation of the elevator. The control device 15 controls the power conversion device 8 based on the information from the car manipulation panel 9, the information from the landing manipulation panel 11, the information from the speed detector 13, and the information from the current detector 14. The control device 15 performs calculation processings at intervals of a calculation period ts.

The control device 15 has a supervision control portion 16, a speed command issuing portion 17, a movement control portion 18, and an acceleration limiting portion 19.

The supervision control portion 16 creates traveling supervision information on the operation of the elevator (e.g., information on a destination floor of car 2 and information on a running command) based on the information from the car manipulation panel 9 and the information from the landing manipulation panel 11.

The speed command issuing portion 17 obtains a speed command for controlling the speed of the car 2 based on the traveling supervision information from the supervision control portion 16.

The movement control portion 18 controls the movement of the car 2 based on the speed command from the speed command issuing portion 17. The movement control portion 18 performs control for the power conversion device 8 to control the movement of the car 2. The movement control portion 18 has a speed controller 20 and a current controller 21.

The speed controller 20 obtains a difference between the speed command from the speed command issuing portion 17 and the information on a rotational speed from the speed detector 13 as speed difference information, and outputs the obtained speed difference information to the current controller 21.

The current controller 21 issues a control command to control the power conversion device 8 based on the speed difference information from the speed controller 20 and the information on a motor current from the current detector 14. That is, the current controller 21 obtains a motor current target value based on the speed difference information from the speed controller 20, and controls the power conversion device 8 such that the value of the motor current detected by the current detector 14 coincides with the motor current target value.

The control command includes a motor current command to adjust the motor current supplied to the motor 6, a torque current command to adjust a torque current causing the motor 6 to generate a rotational torque, and a voltage current to adjust the voltage applied to the motor 6. The voltage command includes information on the switching duty ratio of the voltage applied to the motor 6.

The current controller 21 obtains as a torque current that component of the motor current detected by the current detector 14 which causes the motor 6 to generate the rotational torque, and outputs information on the obtained torque current to the acceleration limiting portion 19. The value of the motor current, the value of the motor current command, the value of the torque current, the value of the torque current command, the value of the voltage command, and the switching duty ratio of the voltage applied to the motor 6 are associated with the output of the hoisting machine 5 and hence constitute drive information corresponding to the output of the hoisting machine 5 during the movement of the car 2.

The acceleration limiting portion 19 compares the value of the torque current from the current controller 21 with a preset limit value to determine whether or not the acceleration of the car 2 can be increased. That is, the acceleration limiting portion 19 makes a positive determination on acceleration possibility, namely, determines that the acceleration of the car 2 can be increased when the value of the torque current from the current controller 21 is smaller than the limit value, and makes a negative determination on acceleration possibility, namely, determines that the acceleration of the car 2 cannot be increased when the value of the torque current from the current controller 21 reaches the limit value. The acceleration limiting portion 19 outputs information on a result of the determination to the speed command issuing portion 17.

The limit value is set based on a rated current value of the power conversion device 8. The limit value may be set based on a maximum current value of the power conversion device 8, a rated current value of the breaker for preventing an overcurrent from flowing into the power conversion device 8, or a motor current value at the time when the car 2 is moved at a maximum acceleration with a maximum permissible load applied thereto.

The speed command issuing portion 17 forcibly stops the acceleration from increasing as to the speed command for the car 2 (forcibly sets the jerk regarding the speed command to 0) while receiving information on a negative determination on acceleration possibility from the acceleration limiting portion 19, and cancels the operation of stopping the acceleration from increasing while receiving information on a positive determination on acceleration possibility from the acceleration limiting portion 19. That is, the speed command issuing portion 17 obtains a speed command to stop the acceleration from increasing (to set the jerk to 0) when the value of the torque current reaches the limit value, and obtains a speed command to cancel the operation of stopping the acceleration from increasing when the value of the torque current is smaller than the limit value. Thus, the value of the torque current is prevented from becoming larger than the limit value.

Next, an operation will be described. When a call registration is made by manipulation of at least one of the car manipulation panel 9 and the landing manipulation panel 11, information on the call registration is transmitted to the control device 15. After that, when an activation command is input to the control device 15, the control device 15 controls the power conversion device 8 to supply the motor 6 with power and releases a brake for stopping rotation of the drive sheave 7. Thus, the car 2 is caused to start moving. After that, the control device 15 performs control for the power conversion device 8 to adjust the speed of the car 2, so the car 2 is moved to a destination floor for which the call registration is made.

Next, the operation of the control device 15 will be described. In the control device 15, the acceleration limiting portion 19 makes a positive determination on acceleration possibility or a negative determination on acceleration possibility based on the torque current of the motor 6.

When information on a call registration is input to the control device 15, the supervision control portion 16 creates traveling supervision information based on the information on the call registration. After that, when the acceleration limiting portion 19 makes a positive determination on acceleration possibility, the speed command issuing portion 17 calculates a set speed, which is obtained according to a preset calculation formula, as a speed command based on the traveling supervision information from the supervision control portion 16. When the acceleration limiting portion 19 makes a negative determination on acceleration possibility, the speed command issuing portion 17 calculates a speed command, which is obtained to stop the acceleration from increasing, based on the traveling supervision information from the supervision control portion 16. The speed command issuing portion 17 calculates the speed command at intervals of the calculation period ts.

After that, the movement control portion 18 controls the power conversion device 8 according to the calculated speed command. Thus, the speed of the car 2 is controlled.

Figure 2:
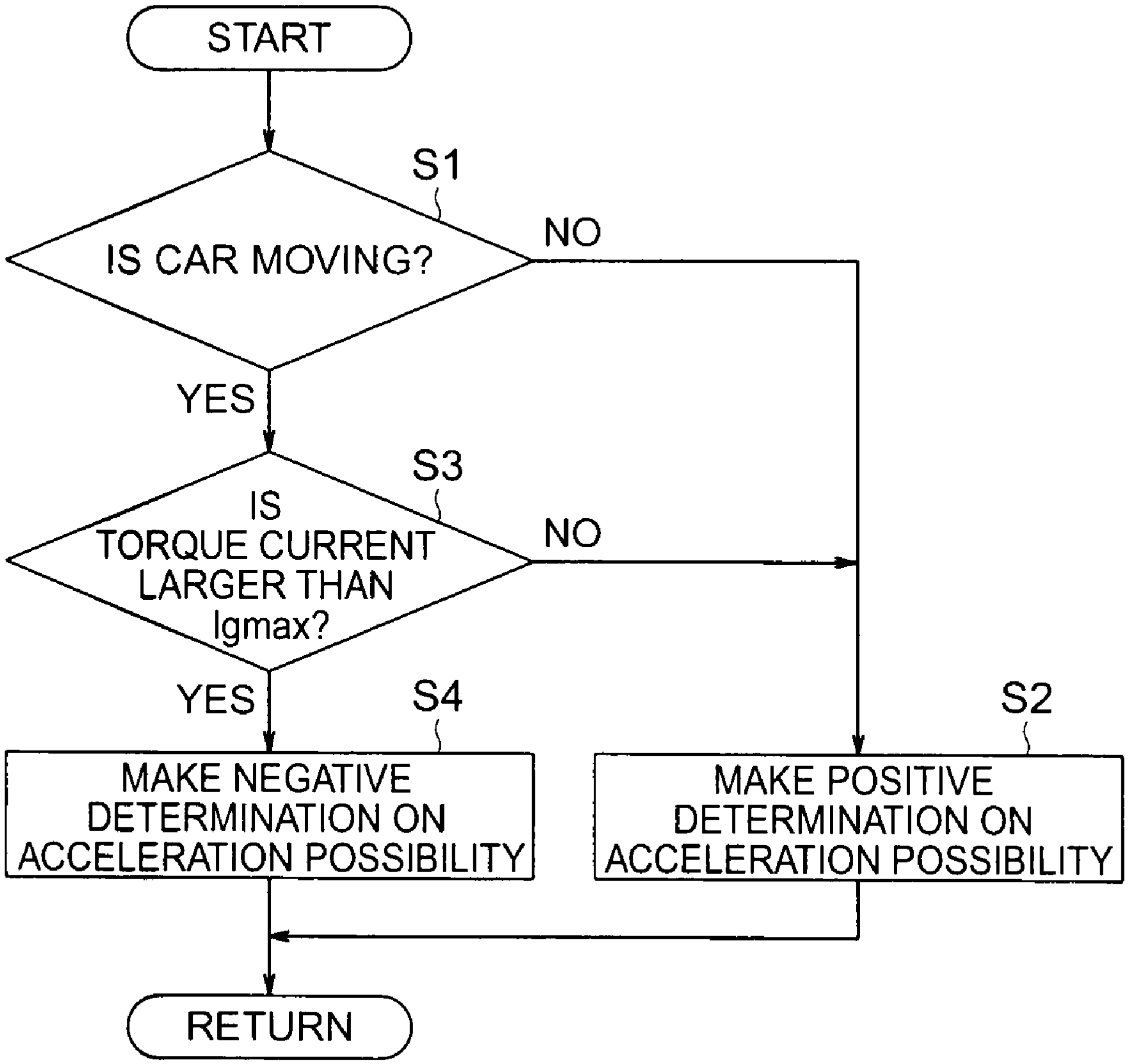
FIG. 2 is a flowchart for explaining a determination operation of an acceleration limiting portion of FIG. 1.

Next, a determination operation of the acceleration limiting portion 19 will be described. FIG. 2 is a flowchart for explaining a determination operation of the acceleration limiting portion 19 of FIG. 1. As shown in FIG. 2, the acceleration limiting portion 19 determines, based on information on the torque current from the current controller 21, whether or not the car 2 is moving (S1). When the car 2 is not moving, the acceleration limiting portion 19 makes a positive determination on acceleration possibility (S2).

When the car 2 is moving, the acceleration limiting portion 19 determines whether or not the torque current is larger than a limit value $I_{qmax}$ (S3). When the torque current is equal to or smaller than the limit value $I_{qmax}$, the acceleration limiting portion 19 makes a positive determination on acceleration possibility (S2). On the other hand, when the torque current is larger than the limit value $I_{qmax}$, the acceleration limiting portion 19 makes a negative determination on acceleration possibility (S4).

Figure 3:
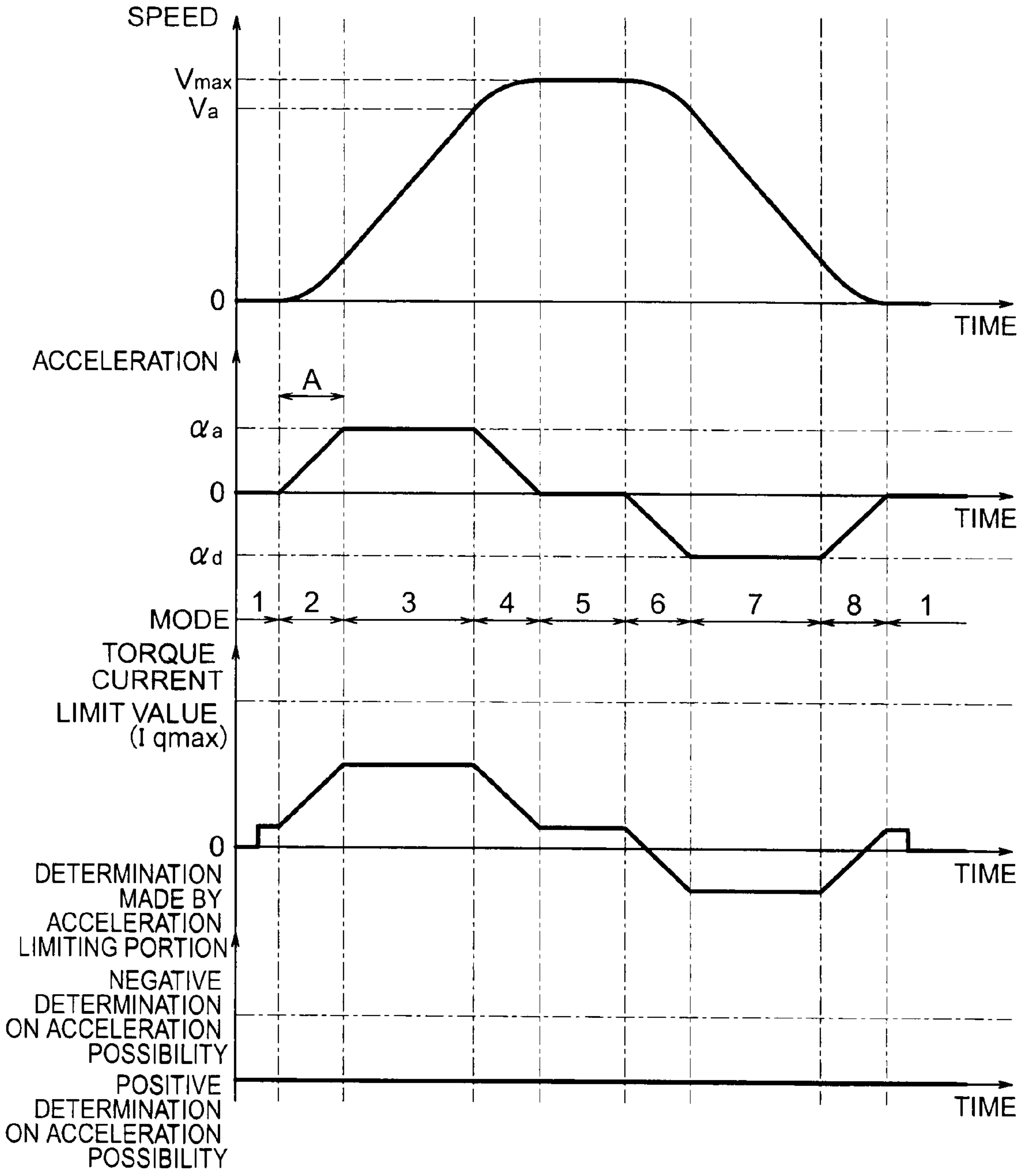
FIG. 3 is a graph showing how values of a speed command, an acceleration corresponding to the speed command, and a torque current, and a state of a determination made by the acceleration limiting portion are each related to time in a case where there is a small difference in weight between a car side and a counterweight side of FIG. 1.

Next, the speed command from the speed command issuing portion 17 in the case where there is a small difference in weight between the car 2 side and the counterweight 3 side will be described. FIG. 3 is a graph showing how values of a speed command, an acceleration corresponding to the speed command, and a torque current, and a state of a determination made by the acceleration limiting portion 19 are each related to time in a case where there is a small difference in weight between a car 2 side and the counterweight 3 side of FIG. 1.

Referring to FIG. 3, MODE=1 represents a state in which no activation command has been input and the speed command is 0 (stopped state), MODE=2 represents a state of acceleration>0 and jerk>0, MODE=3 represents a state of acceleration>0 and jerk=0, MODE=4 represents a state of acceleration>0 and jerk<0, MODE=5 represents a state of constant speed, MODE=6 represents a state of acceleration<0 and jerk<0, MODE=7 represents a state of acceleration<0 and jerk=0, and MODE=8 represents a state of acceleration<0 and jerk>0. The acceleration in the state of MODE=7 is a preset maximum deceleration $\alpha_d$.

In the case where there is a small difference in weight between the car 2 side and the counterweight 3 side, as shown in FIG. 3, the torque current is smaller than the limit value $I_{qmax}$ in all the states of MODE=1 to 8. Accordingly, the acceleration limiting portion 19 constantly makes a positive determination on acceleration possibility and never makes a negative determination on acceleration possibility. Thus, the set speed obtained according to the preset calculation formula is directly calculated as a speed command by the speed command issuing portion 17. That is, the speed command calculated by the speed command issuing portion 17 assumes the very value calculated based on the traveling supervision information, and is not limited by the determination made by the acceleration limiting portion 19. Accordingly, in a section A, the acceleration rises to a preset maximum acceleration $\alpha_a$ without being stopped from increasing.

Figure 4:
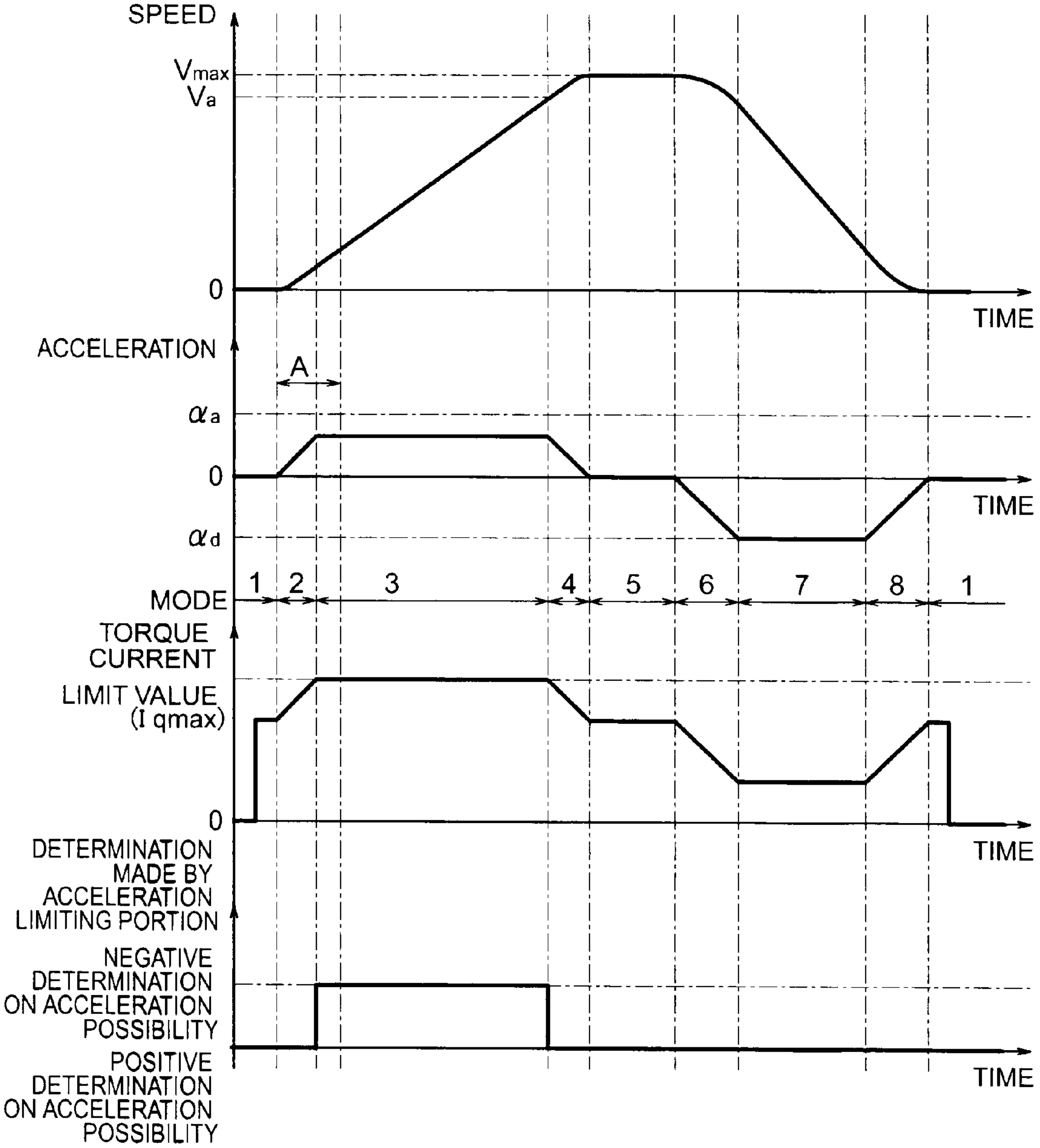
FIG. 4 is a graph showing how values of a speed command, an acceleration corresponding to the speed command, and a torque current, and a state of a determination made by the acceleration limiting portion are each related to time in a case where there is a large difference in weight between the car side and the counterweight side of FIG. 1.

Next, the speed command from the speed command issuing portion 17 in a case where there is a large difference in weight between the car 2 side and the counterweight 3 side as a result of, for example, an increase in the riding load within the car 2 will be described. FIG. 4 is a graph showing how values of a speed command, an acceleration corresponding to the speed command, and a torque current, and a state of a determination made by the acceleration limiting portion 19 are each related to time in the case where there is a large difference in weight between the car 2 side and the counterweight 3 side of FIG. 1.

In the case where there is a large difference in weight between the car 2 side and the counterweight 3 side, a torque current for maintaining the difference in weight is additionally supplied. Therefore, as shown in FIG. 4, the torque current reaches the limit value $I_{qmax}$ within the section A. When the torque current reaches the limit value $I_{qmax}$, the acceleration limiting portion 19 makes a negative determination on acceleration possibility to stop the acceleration from increasing. Thus, the acceleration in the section of MODE=3 is constant at a value lower than the maximum acceleration $\alpha_a$. The section of MODE=2 is short, whereas the section of MODE=3 is long.

Figure 5:
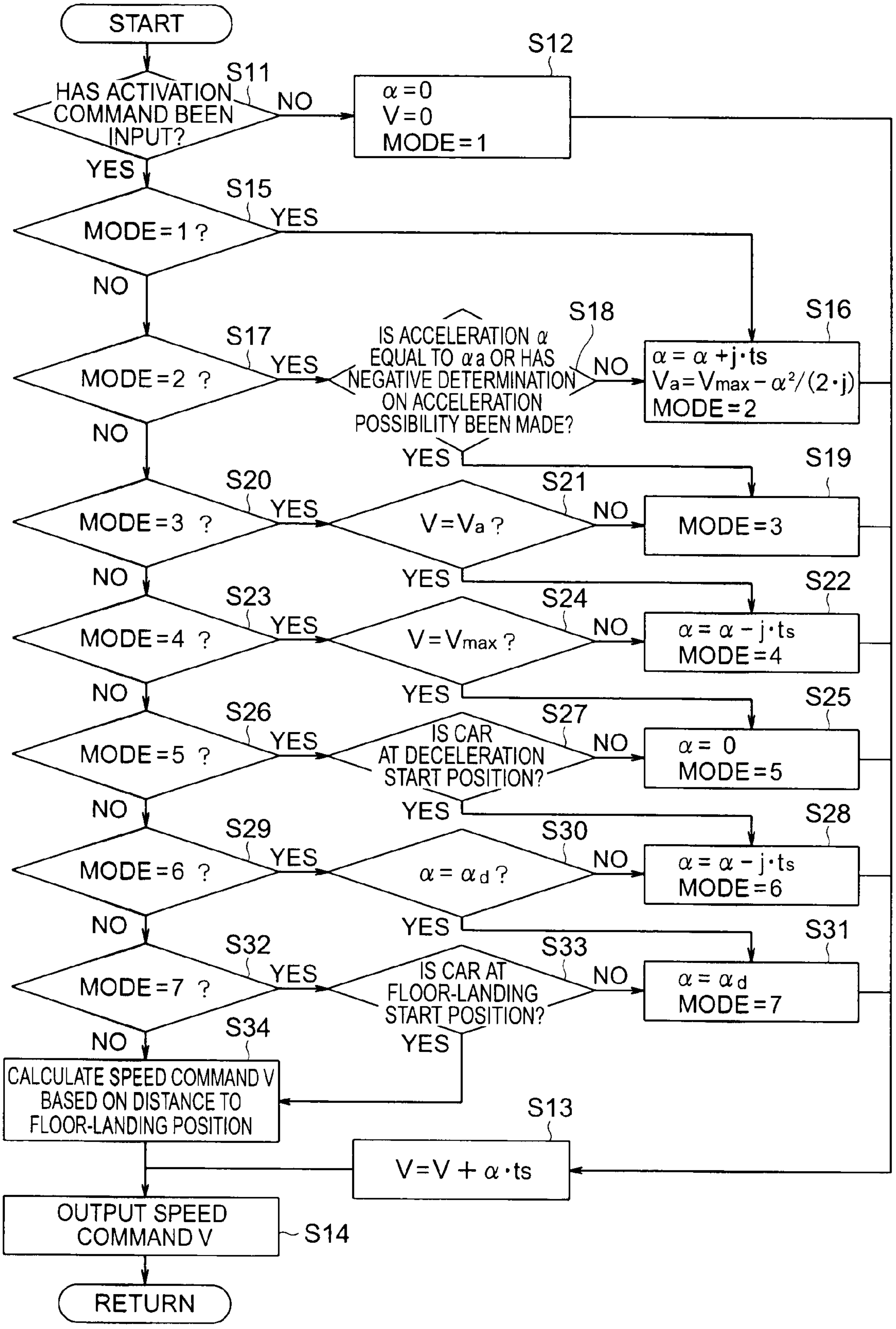
FIG. 5 is a flowchart for explaining an operation of calculating a speed command by a speed command issuing portion of FIG. 1.

Next, the operation of calculating a speed command by the speed command issuing portion 17 will be described. FIG. 5 is a flowchart for explaining an operation of calculating a speed command by the speed command issuing portion 17 of FIG. 1. As shown in FIG. 5, first of all, the speed command issuing portion 17 determines whether or not an activation command has been input to the control device 15 (S11). In a case where the activation command has not been input, the speed command issuing portion 17 sets the acceleration α to 0, sets a speed V to 0, and sets the state of MODE=1 (S12). After that, the speed command issuing portion 17 assigns 0 to the acceleration α and the speed V in an expression (1) to calculate a speed command V (S13).

$$V=V+\alpha\cdot ts \quad (1)$$

After that, the speed command issuing portion 17 outputs the calculated speed command V to the speed controller 20 (S14), thereby terminating a calculation routine on the present cycle.

In a case where the activation command has been input, the speed command issuing portion 17 determines whether or not the state of MODE=1 is established (S15). When the state of MODE=1 is established, the first calculation routine is to be executed after the inputting of the activation command, so the speed command issuing portion 17 sets the state of MODE=2. At this moment, the speed command issuing portion 17 sets the acceleration α according to an expression (2), and sets a transition speed $V_a$ during a transition from MODE=3 to MODE=4 according to an expression (3) (S16).

$$\alpha=\alpha+j\cdot ts \quad (2)$$

$$V_a=V_{max}-\alpha^2/(2\cdot j) \quad (3)$$

In the above-mentioned expressions, j denotes a jerk, and $V_{max}$ denotes a maximum speed of the speed command.

After that, the speed command issuing portion 17 assigns the acceleration α and the last-calculated speed command V to the expression (1) to calculate a new speed command V (S13). After that, the speed command issuing portion 17 outputs the calculated speed command V to the speed controller 20 (S14), thereby terminating the calculation routine on the present cycle.

On the other hand, when the state of MODE=1 is not established, the speed command issuing portion 17 determines whether or not the state of MODE=2 is established (S17). When the state of MODE=2 is established, the speed command issuing portion 17 determines whether or not the acceleration α is equal to the maximum acceleration $\alpha_a$ or the acceleration limiting portion 19 makes a negative determination on acceleration possibility (S18). When the acceleration α is not equal to the maximum acceleration $\alpha_a$ and the acceleration limiting portion 19 does not make a negative determination on acceleration possibility, the speed command issuing portion 17 sets the acceleration α according to the expression (2) and sets the transition speed $V_a$ according to the expression (3). At this moment, the speed command issuing portion 17 maintains the state of MODE=2 (S16).

When the acceleration α is equal to the maximum acceleration $\alpha_a$ or the acceleration limiting portion 19 makes a negative determination on acceleration possibility, the speed command issuing portion 17 sets the state of MODE=3 while maintaining the acceleration α and the transition speed $V_a$ (S19).

After that, the speed command issuing portion 17 assigns the acceleration α and the last-calculated speed command V to the expression (1) to calculate the speed command V (S13). After that, the speed command issuing portion 17 outputs the calculated speed command V to the speed controller 20 (S14), thereby terminating the calculation routine on the present cycle.

When the state of MODE=2 is not established, the speed command issuing portion 17 determines whether or not the state of MODE=3 is established (S20). When the state of MODE=3 is established, the speed command issuing portion 17 determines whether or not the speed command V is equal to the transition speed $V_a$ (S21). When the speed command V is not equal to the transition speed $V_a$, the speed command issuing portion 17 maintains the acceleration α and the transition speed $V_a$ to maintain the state of MODE=3 (S19). When the speed command V is equal to the transition speed $V_a$, the speed command issuing portion 17 sets the acceleration α according to an expression (4) to set the state of MODE=4 (S22).

$$\alpha=\alpha-j\cdot ts \tag{4}$$

After that, the speed command issuing portion 17 assigns the acceleration α and the last-calculated speed command V to the expression (1) to calculate the speed command V (S13). After that, the speed command issuing portion 17 outputs the calculated speed command V to the speed controller 20 (S14), thereby terminating the calculation routine on the present cycle.

When the state of MODE=3 is not established, the speed command issuing portion 17 determines whether or not the state of MODE=4 is established (S23). When the state of MODE=4 is established, the speed command issuing portion 17 determines whether or not the speed command V is equal to the maximum speed $V_{max}$ (S24). When the speed command V is not equal to the maximum speed $V_{max}$, the speed command issuing portion 17 sets the acceleration α according to the expression (4) to maintain the state of MODE=4 (S22). When the speed command V is equal to the maximum speed $V_{max}$, the speed command issuing portion 17 sets the acceleration α to 0 to set the state of MODE=5 (S25).

After that, the speed command issuing portion 17 assigns the acceleration α and the last-calculated speed command V to the expression (1) to calculate the speed command V (S13). After that, the speed command issuing portion 17 outputs the calculated speed command V to the speed controller 20 (S14), thereby terminating the calculation routine on the present cycle.

When the state of MODE=4 is not established, the speed command issuing portion 17 determines whether or not the state of MODE=5 is established (S26). When the state of MODE=5 is established, the speed command issuing portion 17 determines whether or not the car 2 is at a deceleration start position (S27). When the car 2 does not reach the deceleration start position, the speed command issuing portion 17 holds the acceleration α equal to 0 to maintain the state of MODE=5 (S25). When the car 2 reaches the deceleration start position, the speed command issuing portion 17 sets the acceleration α according to the expression (4) to set the state of MODE=6 (S28).

After that, the speed command issuing portion 17 assigns the acceleration α and the last-calculated speed command V to the expression (1) to calculate the speed command V (S13). After that, the speed command issuing portion 17 outputs the calculated speed command V to the speed controller 20 (S14), thereby terminating the calculation routine on the present cycle.

When the state of MODE=5 is not established, the speed command issuing portion 17 determines whether or not the state of MODE=6 is established (S29). When the state of MODE=6 is established, the speed command issuing portion 17 determines whether or not the acceleration α is equal to the preset maximum deceleration $\alpha_d$ (S30) When the acceleration α is not equal to the maximum deceleration $\alpha_d$, the speed command issuing portion 17 sets the acceleration α according to the expression (4) to maintain the state of MODE=6 (S28). When the acceleration α is equal to the maximum deceleration $\alpha_d$, the speed command issuing portion 17 sets the acceleration α to the maximum deceleration $\alpha_d$ to set the state of MODE=7 (S31).

After that, the speed command issuing portion 17 assigns the acceleration α and the last-calculated speed command V to the expression (1) to calculate the speed command V (S13). After that, the speed command issuing portion 17 outputs the calculated speed command V to the speed controller 20 (S14), thereby terminating the calculation routine on the present cycle.

When the state of MODE=6 is not established, the speed command issuing portion 17 determines whether or not the state of MODE=7 is established (S32). When the state of MODE=7 is established, the speed command issuing portion 17 determines whether or not the car 2 is at a floor-landing start position (S33). When the car 2 does not reach the floor-landing start position, the speed command issuing portion 17 holds the acceleration α equal to the maximum deceleration $\alpha_d$ to maintain the state of MODE=7 (S31). After that, the speed command issuing portion 17 assigns the acceleration α and the last-calculated speed command V to the expression (1) to calculate the speed command V (S13). After that, the speed command issuing portion 17 outputs the calculated speed command V to the speed controller 20 (S14), thereby terminating the calculation routine on the present cycle.

When the car 2 reaches the floor-landing start position, the speed command issuing portion 17 calculates the speed command V based on a distance to a floor-landing position of the car 2 to set the state of MODE=8 (S34). After that, the speed command issuing portion 17 outputs the calculated speed command V to the speed controller 20 (S14), thereby terminating the calculation routine on the present cycle.

In the control apparatus for the elevator configured as described above, when the value of the torque current as the drive information reaches the limit value, the speed command issuing portion 17 calculates the speed command to stop the acceleration from increasing, so the car 2 can be moved while directly monitoring the output of the hoisting machine 5. Accordingly, the car 2 can be accelerated more efficiently within the range of the driving capacity of the hoisting machine 5. Thus, the traveling efficiency of the elevator can be enhanced.

The acceleration limiting portion 19 compares the value of the torque current with the limit value to determine whether or not the acceleration can be increased. Therefore, a determination on the possibility of increasing the acceleration can be made easily and more accurately.

The limit value is set based on at least one of the rated current value of the power conversion device 8, the maximum current value of the power conversion device 8, the rated current value of the breaker for preventing an overcurrent from flowing into the power conversion device 8, and the value of the motor current at the time when the car 2 is moved at a maximum acceleration with a maximum permissible load applied thereto. Therefore, the limit value can be set more appropriately. Thus, the outputs of respective components for moving the car 2 can be drawn out more efficiently.

In the foregoing example, the value of the torque current is compared with the limit value. Instead of the value of the torque current, however, a motor current value (instantaneous value or effective value of a motor current), a motor current command value, a torque current command value, a voltage command value, or a switching duty ratio of a voltage applied to the motor 6 may be compared with the limit value.

Embodiment 2

In the foregoing example, the acceleration of the car 2 is increased until the drive information such as the torque current or the like reaches the limit value. However, the acceleration of the car 2 may be limited in accordance with the riding load within the car 2.

Figure 6:
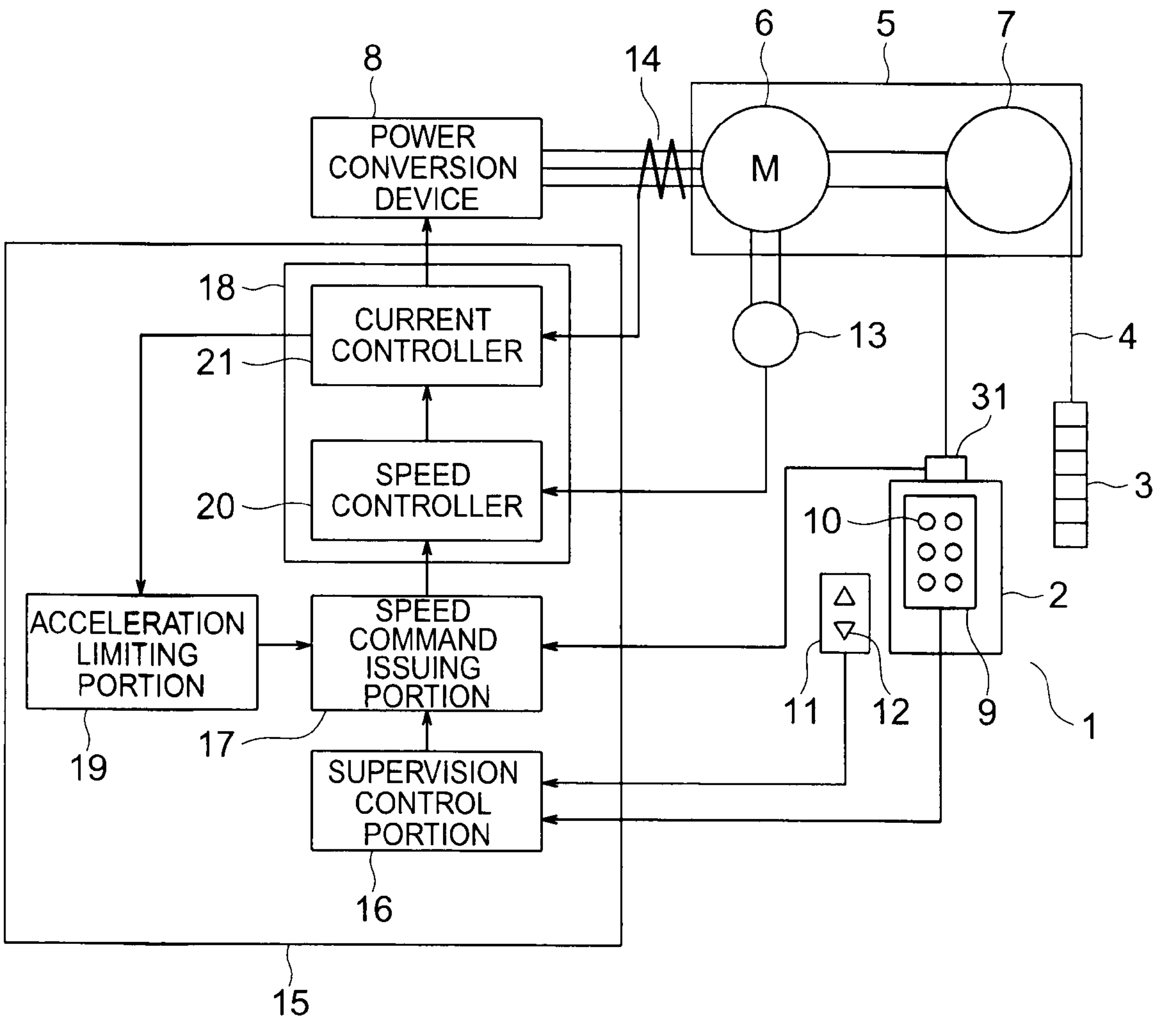
FIG. 6 is a schematic diagram showing an elevator according to Embodiment 2 of the present invention.

That is, FIG. 6 is a schematic diagram showing an elevator according to Embodiment 2 of the present invention. Referring to FIG. 6, a car load detector 31 for detecting the riding load within the car 2 is provided on an upper portion of the car 2. Information from the car load detector 31 is transmitted to the speed command issuing portion 17.

Figures 7, 8:
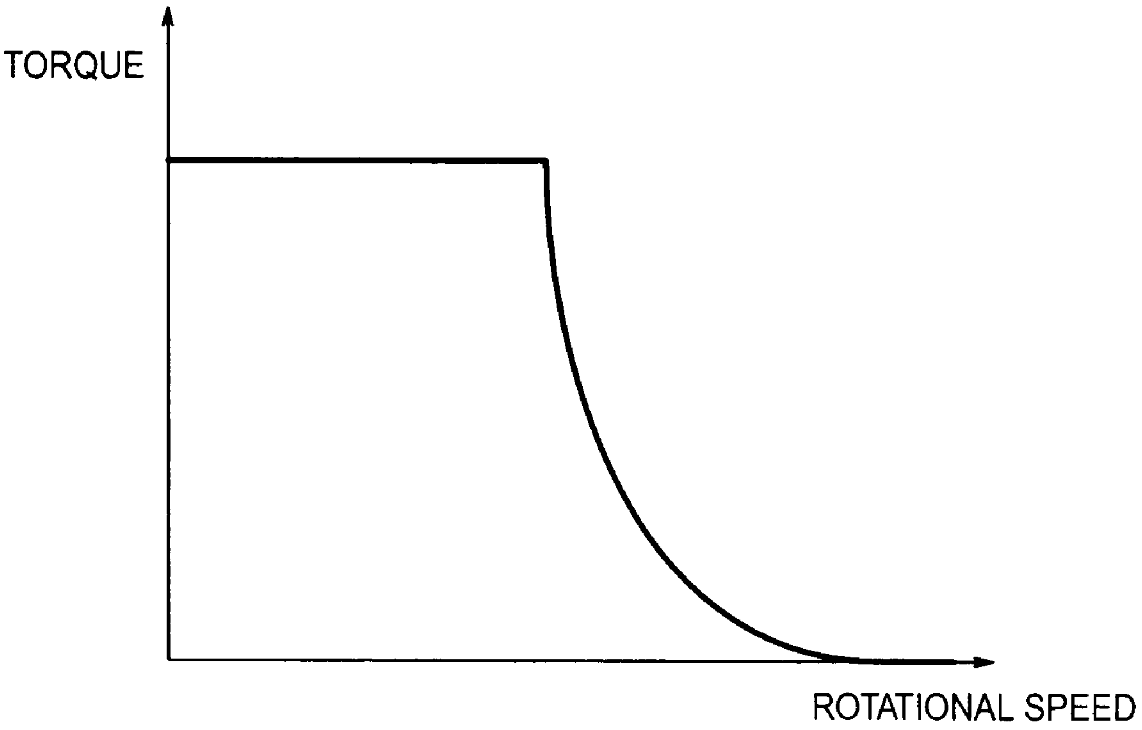
FIG. 7 is a graph showing a relationship between a torque generated by a motor of FIG. 6 and the rotational speed thereof.
FIG. 8 is a table showing tentatively set information set in a speed command issuing portion of FIG. 6.

Reference will now be made to FIG. 7. FIG. 7 is a graph showing a relationship between a torque generated by the motor 6 of FIG. 6 and the rotational speed thereof. As shown in FIG. 7, the torque generated by the motor 6 is small when the rotational speed of the motor 6 is high. Accordingly, the maximum speed of the car 2 can be increased as the torque of the motor 6 decreases. That is, the maximum speed of the car 2 can be increased as the acceleration of the car 2 is reduced.

As is generally known, when the riding load within the car 2 is small, the number of passengers is small and the number of floors at which the car 2 is stopped is small, so the moving distance of the car 2 is large.

When the moving distance of the car 2 is large, the car 2 remains at the maximum speed for a long time. Therefore, in a case where the acceleration of the car 2 is made low and the maximum speed of the car 2 is made high, the car 2 can be caused to reach each destination floor in a shorter period of time than in a case where the acceleration of the car 2 is made high and the maximum speed of the car 2 is made low.

Thus, the speed command issuing portion 17 tentatively sets a limit acceleration/deceleration corresponding to the riding load within the car 2 based on information from the car load detector 31 when the car 2 is caused to start moving, and calculates a speed command such that the acceleration/deceleration of the car 2 becomes equal to or lower than the limit acceleration/deceleration. The maximum value of the speed command is set so as to increase as the riding load within the car 2 decreases.

Tentatively set information where the value of the limit acceleration/deceleration (acceleration set value) corresponds to the riding load ratio within the car 2 (ratio of the riding load to the maximum permissible load of car 2) is set in advance in the speed command issuing portion 17.

FIG. 8 is a table showing the tentatively set information set in the speed command issuing portion 17 of FIG. 6. As shown in FIG. 8, the tentatively set information of this example is divided into three stages at which the riding load ratio within the car 2 is 0 to 10%, 10 to 20%, and equal to or higher than 20%, respectively. The values of the limit acceleration/deceleration corresponding to those stages are set.

The speed command issuing portion 17 compares the information from the car load detector 31 with the tentatively set information to calculate the limit acceleration/deceleration to be set tentatively. Embodiment 2 of the present invention is identical to Embodiment 1 of the present invention in other configurational details and other operational details.

In the control apparatus for the elevator configured as described above, the limit acceleration/deceleration corresponding to the riding load within the car 2 is tentatively set when the car 2 is caused to start moving, and the speed command is calculated such that the acceleration/deceleration of the car 2 becomes equal to or lower than the limit acceleration/deceleration. Therefore, the maximum speed of the car 2 can be increased in an off-peak period during which the moving distance of the car 2 is large, and the acceleration of the car 2 can be increased in a peak period during which the moving distance of the car 2 is small. Thus, the traveling efficiency of the elevator can further be enhanced.

The invention claimed is:

1. A control apparatus for an elevator, comprising:

a speed command issuing portion for calculating a speed command for controlling a speed of a car;

a movement control portion for controlling a movement of the car based on the speed command; and an acceleration limiting portion for determining whether or not an acceleration of the car can be increased by comparing drive information corresponding to an output of a drive device during the movement of the car with a preset limit value, wherein the speed command issuing portion calculates, based on information from the acceleration limiting portion, the speed command to stop the acceleration from increasing when the drive information is at the limit value.

2. A control apparatus for an elevator according to claim 1, wherein:

the movement control portion controls a power conversion device for supplying a motor of the drive device with power to control the movement of the car; and the drive information is a motor current value indicating any one of a value of a motor current supplied to the motor, a motor current command value issued from the movement control portion to adjust the motor current, a torque current value indicating a value of a torque current causing the motor to generate a rotational torque, a torque current command value issued from the movement control portion to adjust the torque current, a voltage command value issued from the movement control portion to apply a voltage to the motor, and a switching duty ratio of the voltage applied to the motor.

3. A control apparatus for an elevator according to claim 1, wherein:

the movement control portion controls a power conversion device for supplying a motor of the drive device with power to control the movement of the car; and the limit value is set based on at least one of a rated current value of the power conversion device, a maximum current value of the power conversion device, a rated current value of a breaker for preventing an overcurrent from flowing into the power conversion device, and a value of a motor current supplied to the motor at a time when the car is moved at a maximum acceleration with a maximum permissible load applied thereto.

4. A control apparatus for an elevator according to claim 1, wherein the speed command issuing portion tentatively sets, based on information from a car load detector for detecting a riding load within the car, a limit acceleration/deceleration corresponding to the riding load when the car is caused to start moving, and obtains the speed command such that an acceleration/deceleration of the car becomes equal to or lower than the limit acceleration/deceleration.

* * * * *